United States Patent [19]

Hodgson

[11] 4,078,219

[45] Mar. 7, 1978

[54] OVERCURRENT LATCH FOR MAGNETIC CONTACTOR

[75] Inventor: Alfred W. Hodgson, Orchard Park, N.Y.

[73] Assignee: Westinghouse Electric Corporation, Pittsburgh, Pa.

[21] Appl. No.: 714,219

[22] Filed: Aug. 13, 1976

Related U.S. Application Data

[63] Continuation-in-part of Ser. No. 657,427, Feb. 11, 1976, abandoned.

[51] Int. Cl.² .............................................. H01H 9/20
[52] U.S. Cl. ..................................... 335/167; 335/195
[58] Field of Search .................. 335/16, 167, 170, 195

[56] References Cited

U.S. PATENT DOCUMENTS 3,882,435   5/1975   Grass et al. ...................... 335/167 X Primary Examiner—George Harris
Attorney, Agent, or Firm—L. P. Johns

[57] ABSTRACT

An electromagnetic contactor characterized by stationary and movable contacts operable between open and closed positions by an armature of an electromagnet which is movable between energized and deenergized positions, and latch means for latching the armature in the energized position to hold the contacts in the closed position when the load current through the contact exceeds a predetermined value even though the electromagnet means is deenergized.

15 Claims, 6 Drawing Figures

OVERCURRENT LATCH FOR MAGNETIC CONTACTOR

CROSS-REFERENCE TO RELATED APPLICATIONS

This invention is related to those disclosed in the applications of Alfred W. Hodgson, Ser. No. 657,429, filed Feb. 12, 1976, now abandoned; Alfred W. Hodgson and J. D. Collins, Ser. No. 657,428, filed Feb. 12, 1976, now abandoned; and is a continuation-in-part of Ser. No. 657,427, filed Feb. 11, 1976, now abandoned.

BACKGROUND OF THE INVENTION

1. Field of the Invention:

This invention relates to an electromagnetic contactor and more particularly, it pertains to an overcurrent latch therefor.

2. Description of the Prior Art:

The typical magnetic contactor generally used in industry may from time to time see load currents of from four to ten times the rating of the contactor. If the overload condition persists, an overload relay acts to open the contactor in which case the contactor must interrupt whatever load current is flowing to remove the load from the power system. In many applications, the power system capacity is practically unlimited. Indeed, in some industries such as marine, railway, mining, offshore drilling, off road construction, there are a number of applications in which space is at a premium and the machinery builder must resort to unconventional practices to squeeze maximum performance into minimum space. In most of these applications, a power system has a limited capacity.

SUMMARY OF THE INVENTION

It has been found in accordance with this invention that a latch structure is provided for an electromagnetic contactor which comprises stationary and movable contacts, electromagnetic means for moving the movable contacts to the closed position, operative means for moving the movable contact to the open position when the electromagnetic means is deenergized, the electromagnetic means comprising an armature movable between energized and deenergized positions, latch means comprising a magnet responsive to a predetermined value of load current to effect movement of latch means to the latched position of the armature and a frame mounting the magnet, the latch means being operative to effect latching of the armature in the energized position to hold the contacts in the closed position in the event the load current exceeds a predetermined value even though the electromagnetic means is deenergized, the latch means also comprising a latch lever and lever-engaging roller-pin which lever is on the frame and the lever-engaging roller-pin being on the armature, and the latch means being unlatchable to effect opening of the contacts if the magnet is deenergized when the load current decays to a second predetermined value.

The advantage of the device of this invention is that it may be employed to make possible the use of a contactor having an interrupting rating of only 1.1 to 1.2 times rather than 4 to 10 times its continuous rating. This device is frequently employed in power systems of limited capacity to hold contacts closed until load current decays to a safe value. In other applications, it may be used to hold the contactor closed under heavy load conditions to provide time for a backup device to operate and remove power or for the heavy load condition to subside. These are specialized applications in which the complete system must be carefully coordinated, but substantial space and cost savings are possible since a contactor with a 1.10 to 2 times interrupting rating can be used, rather than one with a 4 to 10 times interrupting rating. In these applications, a current sensitive latch is necessary because conventional magnetic contactors are operated by an electromagnet which holds the main contacts closed only as long as the electromagnet is energized at a certain level. In the event line voltage and operating coil voltage momentarily drop below this certain level, as during overload conditions, the contactor will open instantly.

DESCRIPTION OF THE PREFERRED EMBODIMENT

Figure 1:
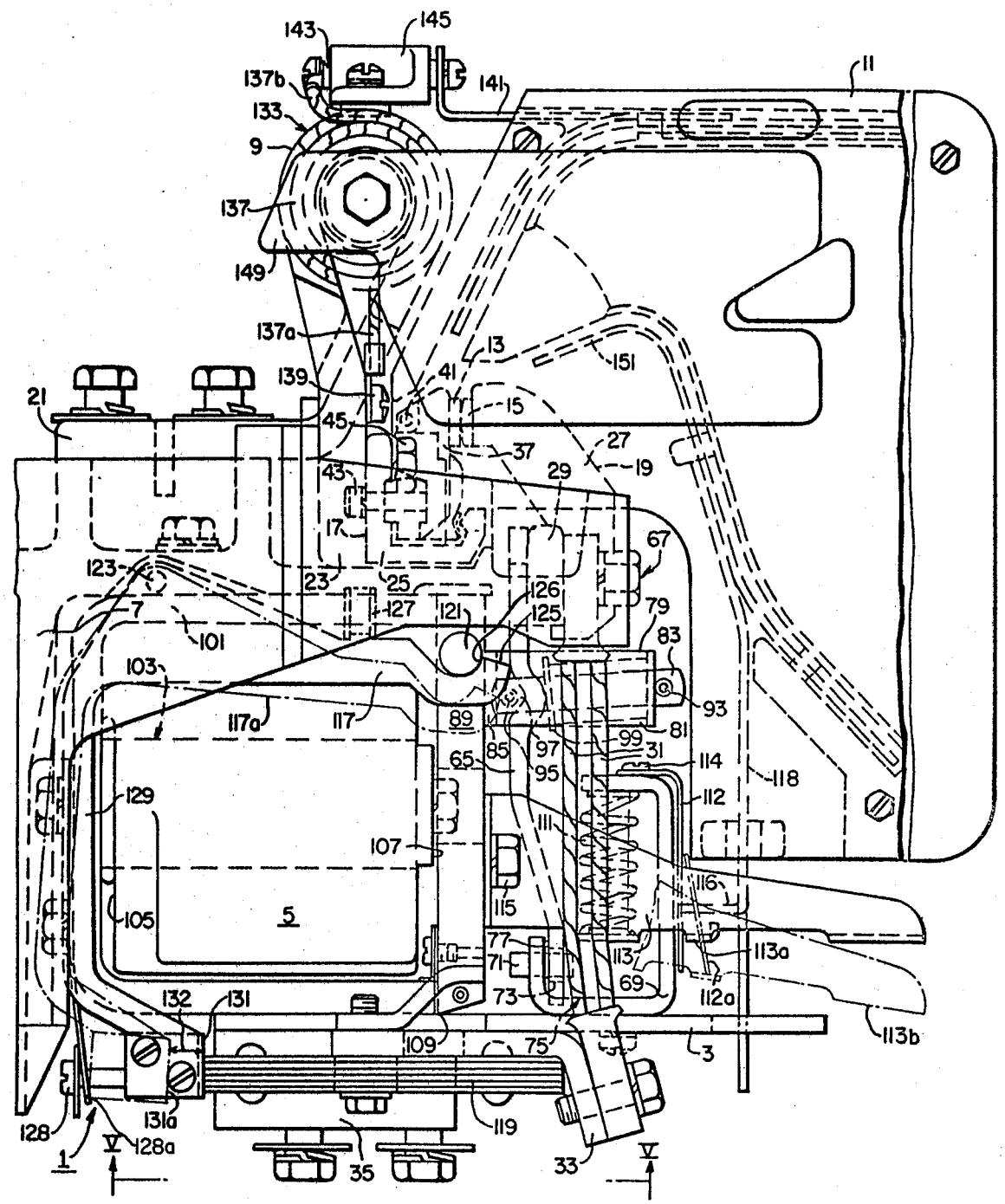
FIG. 1 is a left side view of the contactor of this invention.

In FIG. 1 a contactor is generally indicated at 1 and it comprises a base plate 3, electromagnetic means or electromagnet 5, an electrically insulating housing 7, arc blowout unit 9, and an arc chute 11. The contactor 1 also comprises a stationary contact 13, and a movable contact 15 which are mounted on conductor structures 25 and 19, respectively.

The contactor 1 of this invention is generally described in U.S. Pat. No. 3,511,950 for which reason the description of the contactor 1 is limited herein to the basic structure, operation, and new and different structures. Suffice it to say, an electrical circuit through the contactor 1 includes a line terminal 21, the blowout unit 9, contact mounting bracket 25, contacts 13, 15, contact mounting arm 27, contact shunt connector 29, shunt 31, shunt connector 33, and load terminal 35. The blowout unit 9 comprises a coil 133 (FIG. 3) extending from the terminal 21 to the bracket 25.

The stationary contact 13 comprises a plurality of, such as two, fixed contact sections 37, 39 (FIG. 4) and a pivoted contact section 41, which is disposed between the fixed sections. The fixed contact sections 37, 39 are secured by similar bolts 43 through the contact mounting bracket 25 which is secured by spaced bolts 45 to the lower end of the blowout coil 133. Thus, there is optimum electrical contact between the fixed contact sections 37, 39 and the bracket 25. Moreover, the stationary contact subassembly including the bracket 25 and the contact sections 37, 39, 41 is replaceable without removing the live connection to the line terminal 21.

Figure 3:
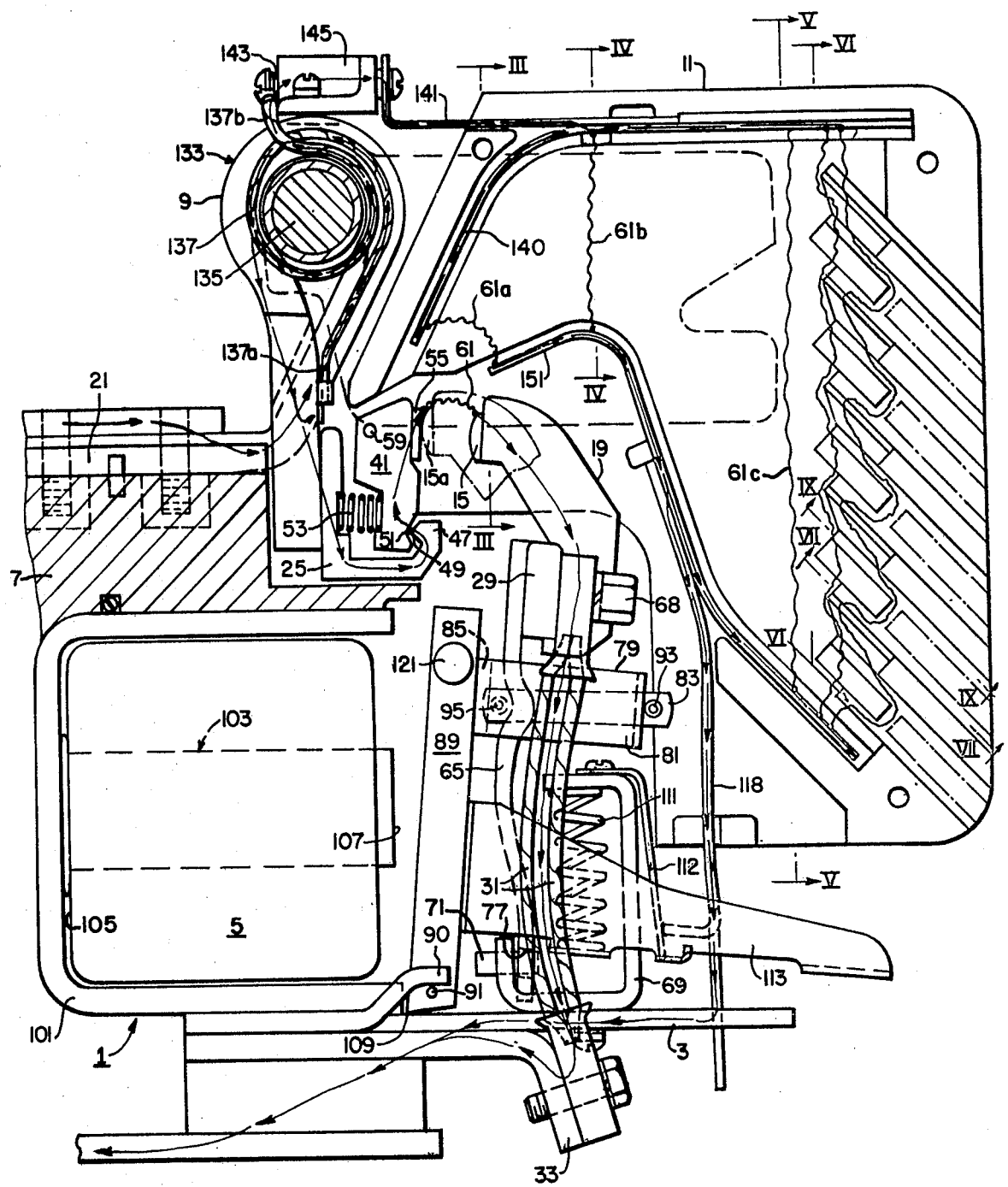
FIG. 3 is a sectional view.
Figure 4:
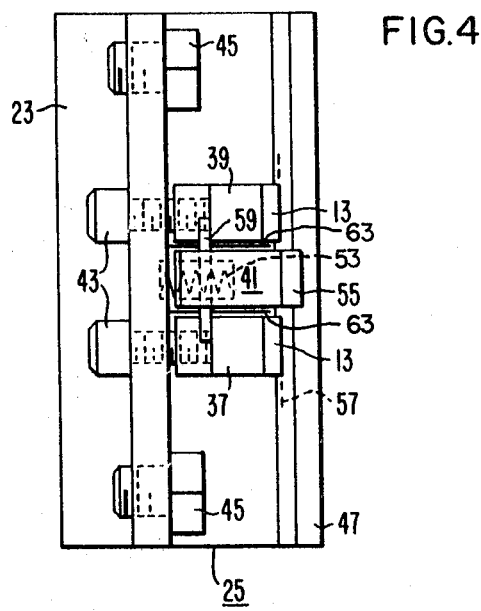
FIG. 4 is a fragmentary view of the stationary contacts.

As shown more particularly in FIG. 3, the pivot contact section 41 is pivotally mounted on the bracket 25 which is an extruded member having a reversed-J configuration which includes an upturned portion 47 comprising a pivot point or knife edge 49. The pivot section 41 includes a corresponding in-turned groove 51 having a V-shaped cross-section in which the knife edge 49 is seated. A coil spring 53 is disposed between the bracket 25 and the pivot section 41 on the side thereof opposite the pivot location. In addition, the spring 53 biases the pivot section 41 clockwise about the pivot point or knife edge 49. As a result, a contact 55 of the pivot section 41 is normally disposed beyond the frontal contact surfaces of the contacts 13 as defined by a line 57 (FIG. 4). The pivot section 41 also includes a limit pin 59 which contacts the fixed contact sections 37, 39, thereby limiting the travel of the pivot section by a limited distance beyond the alignment line 57 when the movable contact 15 is in the open position. In addition, the knife edge 49 is located directly below the contact surfaces of the contact 55 to minimize contact wipe and resulting contact wear.

When the movable contact 15 moves from the closed to the open position (FIG. 3), an arc 39 occurs between the separated contacts and is restricted to the contacts 15, 55 with a resulting path of current travel being through the contact 55, the pivot section 41, the knife edge 49, and the mounting bracket 25. Thus, the arc 39 avoids the contacts 13 which remain clean and run cooler than the pivot section 41. Small sheets 63 of insulating material are mounted between the fixed contact sections 37, 39 and the pivot section 41 to space the contact sections apart to prevent the pivot section from being welded to the fixed section when an arc 39 occurs. The sheets 63 also retain the contact spring 53 behind the pivot section. In order to maximize the electric conductivity between the pivot section 41 and the upturned portion 47, the knife edge 49 and the groove 51 are provided with surfaces coated with silver inlay or shim which are brazed in place in order to minimize the heating effect of the contacting parts when the current flows.

The advantages of the pivot section 41 is the additional contact point to increase the continuous current carrying capacity of the contactor, momentary contact before and after the contactors are closed and opened, and the provision of vibration resistance by the pivot section.

The movable contact 15 (FIG. 1) is free to move tortionally so that it may twist as necessary to make contact with both fixed contact sections 37, 39. The moving contact mounting bracket 27 and the shunt connector 29 are bolted by bolts 67 to the upper end of the lever 65 which is a T-shaped member. The opposite ends of connector 29 are attached to the shunts 31 by bolts 68 (FIG. 3). The lower end of the lever 65 is pivoted about an upturned portion of a mounting bracket 69 that is bolted on the base plate 3. Vertical and horizontal movement of the lever 65 is limited at its pivot point by a roll pin 71 (FIG. 1) which is secured in the bracket 69. The pin 71 extends through an aperture 73 which is larger than the diameter of the pin to enable limited vertical and horizontal movement. The lower end portion of the lever projects into a slot 75 in the bracket 69 to prevent disengagement of the lever from the pin 71.

A washer 77 on the pin 71 is located between the upturned portion of the bracket 69 and the lever 65 to provide for free tortional movement of the lever.

Figure 2:
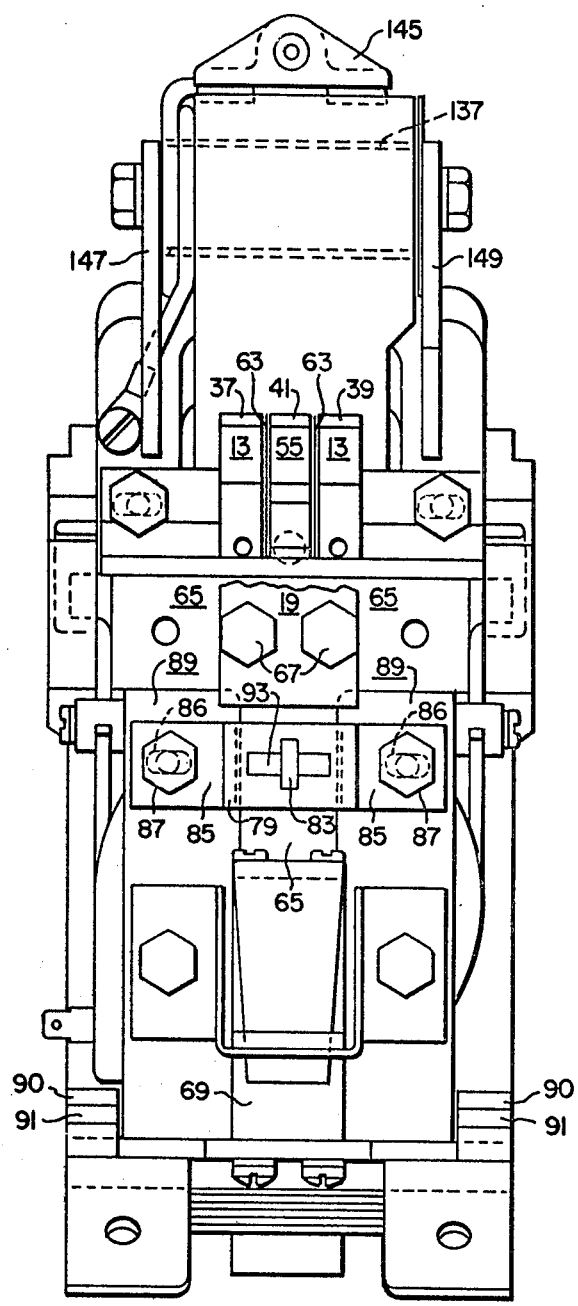
FIG. 2 is a front view of the contactor with the arc chute removed.

The lever 65 is additionally guided by a spring support structure comprising U-shaped bracket 79, a coil spring 81, and a link 83. The bracket 79 is provided with out-turned flanges 85 which are secured by similar bolts 87 (FIG. 2) to an operating armature 89 of the electromagnet 5. Each flange 85 includes an elongated hole or slot 86 to permit lateral adjustment of the position of the movable contact 15 and to provide means of aligning the vertical edges of the contact face of the movable contact with the outer edges of the stationary contacts 13. The link 83 extends through the bracket 79 with the right end portion retained against the outer end of the bracket by a pin 93 and with the left end portion secured by a pin 95 in a notch 97 in the lever 65. The coil spring 81, being disposed around the link 83, is compressed between the outer end of the bracket 79 and a washer 99 against the lever 65. When the armature 89 is in the open gap position (FIG. 3), the contacts 13, 15 are open and the lever 65 is urged towards the armature by the spring 81. The armature 89 and the lever 65 are pivoted at different locations so that when the armature opens and closes, there is a linear displacement between the armature and the lever at the point where the armature and lever would engage if travel of lever 65 were not limited by parts 83, 93, 95.

When the armature is in the closed position (FIG. 1), the spring 81 is compressed against the lever 65 to retain the contacts 13, 15 in tightly closed positions despite normal contact wear and manufacturing tolerances. Inasmuch as the armature 89 and the lever 65 are pivoted at different locations, there is considerable linear displacement between the armature and the lever at the location of the link 83.

If the lever 65 were to strike the armature 89 when the contacts 13, 15 separate, sliding friction would result between the lever and armature. To avoid such friction the travel of the lever 65 is limited by the link 83 in which the pins 93, 95, being roll pins, are pressed in place at opposite ends and serve as low friction pivot points. Since the link 83 is free to pivot at both ends, the armature 89 and the lever 65 are able to rotate freely about different pivot points.

When the contacts 13, 15 are closed, the lever 65 stops moving, but the armature 89 continues moving until it reaches the closed position and the movable contact 15 is held in engagement with the stationary contact by the lever 65. The movable contact 15 being a single piece member spans all three stationary contact sections 13, 55. With new contacts, a predetermined overtravel gap is provided at one or both ends of the link 83 so that proper contact force is maintained despite variations in component parts due to manufacturing tolerances and/or normal wear. The shunts 31, being made of fine braded wire, are flexible members which together with the pin 71 in the oversized aperture 73, permit free tortional movement of the moving contact assembly.

The operating electromagnet 5 consists of the armature 89, U-shaped magnetic frame 101, a round magnetic core 103, an operating coil 105, and a magnetic pole face 107. The lower end of the armature 89 is beveled or has a knife edge bearing surface 109 pivotally mounted on the base plate 3 where it serves as the pivot point for the armature. The armature 89 is positioned laterally by upturned ears 90 on the base plate 3 and vertically by pins 91 (FIG. 3) extending below the ears from opposite sides of the armature.

The upper end of the bracket 69 supports the upper end of a kick-out spring 111, the lower end of which biases an arm 113 downwardly. As shown in FIG. 1, the arm 113 is bolted at 115 to the armature 89 so that when the electromagnet 5 is deenergized the spring 111 moves the armature 89 clockwise to open the contacts 13, 15. The outer end of the arm 113 may be used to operate electrical interlocks (not shown) associated with the contactor 1, or provide mechanical interlocking between the arc chute 11 and the contacts 13, 15.

Moreover, a leaf spring 112 (FIG. 1) is mounted on the bracket 69 by a bolt 114 to make connection with a flange 116 of a load arc horn connector 118 and to provide a complete electrical path to the base plate 3. When the arc chute 11 is removed for any purpose, such as maintenance, the spring 112 moves to the broken line position 112a where its lower end extends into the path of upward movement of an ear 113a of the arm 113 when the arm is in broken line position 113b. Thus, the contactor cannot be operated until the arc chute is replaced.

In some circumstances an overcurrent latch is necessary to prevent the contacts 13, 15 from opening in the event load current exceeds a predetermined value even though the electromagnet is deenergized. When the load current later decays to a second predetermined value, the latch will disengage to allow the contacts 13, 15 to open if the electromagnet 5 is also deenergized. A typical magnetic contactor generally used in industry may from time to time see load currents from four to ten times the rating of the contactor. If this overload condition persists, an overload relay will act to open the contactor in which case the contactor must interrupt whatever load current is flowing to remove the load from the power system. In most applications the power system capacity is practically unlimited. In some special applications it is not necessary that the contactor be opened under overload conditions. Thus, the contactor interrupting rating may be the same as its continuous rating. However, under overload conditions, it is important that the contacts remain closed even though the operating magnet 5 is deenergized.

In accordance with this invention the latch structure consists of a latch lever 117 and a latch magnet 119. A latch roller 121 is provided on at least one side of the armature 89, depending upon whether one or a pair of latch levers are also provided. The latch lever 117 is pivoted on the housing 7 at 123 and includes a hook or upturned portion 125 for engaging the latch roller 121 when the latch magnet 119 is energized. The latch hook surface 126, which engages the latch roller 121, is inclined or beveled downwardly toward the unlatched position so that a small unlatching force is developed to assure the reliability of the latch release function. When the latch magnet 119 is deenergized, a coil sping 127 mounted on the housing 7 positions the lever 117 at a broken line position 117a and likewise positions the hook 125 to an unlatched position with the roller 121. The lever 117 includes a down-turned portion 129 having an armature 131 at the lower end thereof. A latch release calibration screw 128 is mounted in the armature 131 and engages a leaf type latch kickout spring 128a at the same instant the latch engages the roller 121 so will control the value of load current at which the latch will release but has no effect on latch pickup current. The spring 128a is mounted on the frame 101. The calibration screw 128 is of the self-locking type and may be screwed in or out of the armature 131 to apply more or less kickout force on the latch armature. Increasing the force exerted by the leaf spring 128a will increase the value of load current at which the latch armature will unseal and allow the main contacts to open, so a means of adjusting release current is thus provided.

A bias spring 127 is mounted on the horizontal leg of the latch lever 117 also acting to release the latch. The spring 127 is relatively weak compared to the unsealing spring 128a so has little effect on latch release calibration, but is the main opening force in the open gap position and thus, determines the latch pickup current. When load current drops below the latch release point, the latch moves to the unlatched position and the calibration adjustment screw 128 disengages the latch unsealing spring 128a. The spring 127 rotates the latch lever in a clockwise direction until the vertical legs of the latch lever butt against a portion of the contactor base 7 which acts as a stop. In the event the contactor voltage coil 105 is energized, the holding magnet armature 89 remains sealed in and the main contacts 13, 15 remain closed regardless of latch position. When the contactor voltage coil 105 is deenergized, and the latch is released, the holding magnet armature 89 opens and the contacts 13, 15 open.

The manufacturing tolerances on the latch settings determine the minimum interruption rating a contactor must have so that they have an important bearing on the ultimate size and cost of the contactor. When used with the 1250 ampere contactor the latch will usually be set to engage at 1800 to 2000 amperes and disengage at 1600 to 1800 amperes so that the contactor will latch closed at maximum of 2000 amperes and will, therefore, never attempt to interrupt more than 2000 amperes.

The latch magnet 119 (FIG. 5) is a U-shaped magnetic yoke disposed around the load terminal 35 and has a non-magnetic gap 132 between the armature and yoke pole face when the armature is picked up. Under normal operating conditions, an air gap 132 exists between the armature 131a and the pole face of the latch magnet 119 and the hook 125 is disengaged from the roller 121. When a load current 131b (FIG. 5) flows through the shunt connector 33 and the load terminal 35, it acts to magnetize the latch magnet 119 and the armature 131. When the load current 131b and the magnetizing force 131c reach a predetermined value determined by latch bias spring 127, the latch armature 131 is attracted to the latch magnet 119 to move the latch lever 117 into the engaged position with the hook 125 engaging the latch rollers 121 and calibrating screw 128 engaging kickout spring 128a.

When load current drops below the latch release point determined by spring 128a, the latch lever 117 unlatches and the calibration adjustment screw 128 will disengage the spring 128a. The latch lever 117 rotates in a clockwise direction until the vertical legs of the latch lever butt against a portion of the contactor base 7 which acts as a stop. In the event the coil 105 is energized, the holding magnet armature will remain sealed in and the main contacts will remain closed regardless of latch position. When the coil 105 is deenergized, and the latch lever 117 is released, the holding magnet armature will open to its full gap and the main contacts of the contactor will open.

Figure 6:
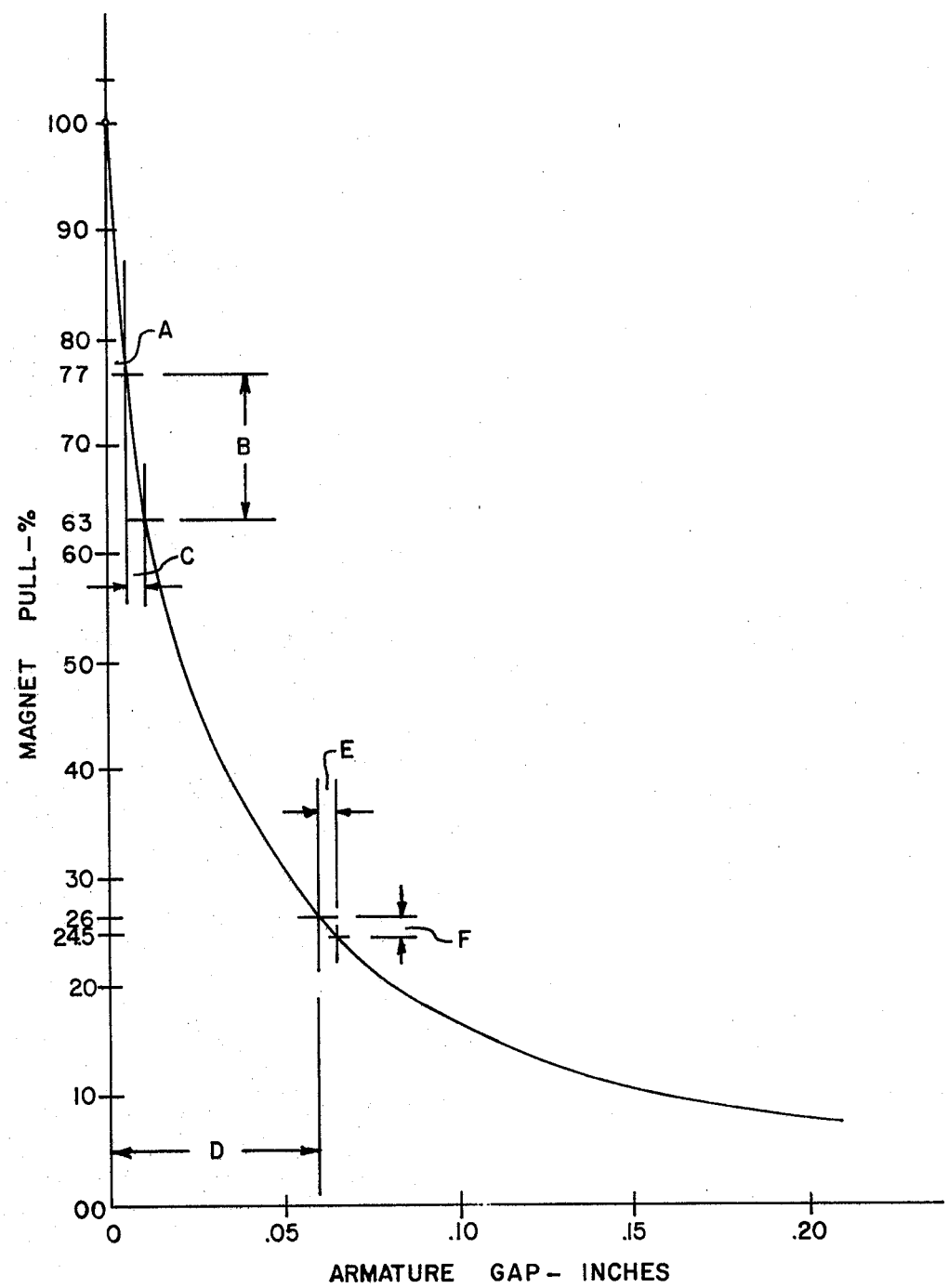
FIG. 6 is a graph of percent of magnetic pull vs. armature gap in inches.

The non-magnetic gap 132 is 0.062 inch so that the magnet operates on a relatively flat portion of its pull curve where release calibration is least sensitive to mechanical variations as illustrated on the curve in FIG. 6, in which A is the operating point for some latches of prior art construction, B is an 18% range in pull force and latch calibration, C is the 0.005 inch change in the armature gap, D is the operating point for the latch of the latch armature 131, E is the 0.005 inch change in the armature gap of the armature 131, and F is a 6% range in the pull force and latch calibration for the armature 131. At load currents in the release range, the magnetic circuit is operated below its saturation point so that the magnetic field strength in the latch magnet will be proportional to load current and the latching device will, as a result, be able to sense load current with greatest accuracy. The bias spring 127 rate is such that the slope of the spring curve is much flatter than the pull curve of the latch magnet to provide bistable operation of the latch. The latch magnet assembly 119-131 is oriented in such a manner, with respect to the contact holding magnet 101, that the magnetic field in the latch armature 131 is at right angles to the magnetic field in the holding magnet frame 101. This prevents interaction between the magnetic fields of the two magnets 5 and 119, and latch calibration is, therefore, unaffected by the polarity and/or strength of the magnetic field in the holding magnet 5. Latch levers 117 are made from a non-magnetic material to eliminate latch malfunction due to the magnetic field surrounding the holding magnet 5.

Figure 5:
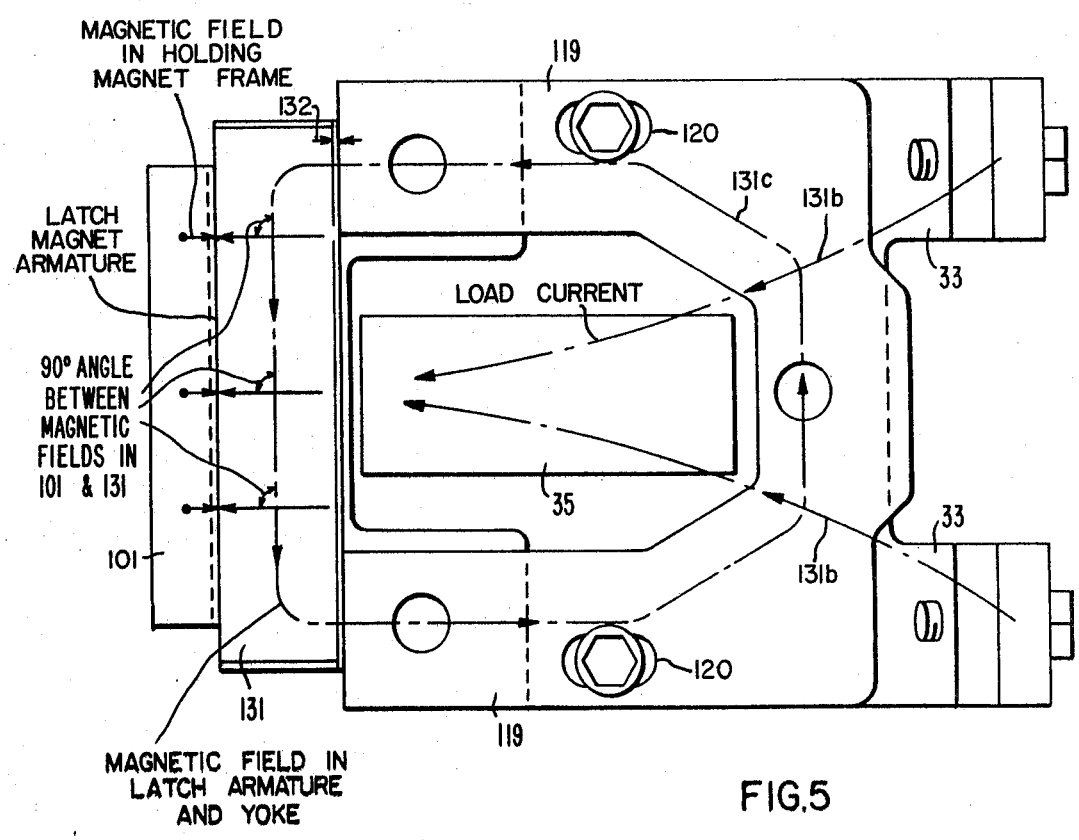
FIG. 5 is a horizontal sectional view taken on the line V—V of FIG. 1.

The magnet yoke 119 is bolted to the underside of the shunt connector using elongated bolt holes 120 as shown in FIG. 5 so that the yoke may be moved back and forth in a horizontal direction to provide proper engagement between the latch hooks 125 and latch rollers 121. The angle of the latch hook surface, which engages the latch roller, is such that a small unlatching force is developed to assure the reliability of the latch release function. Needle bearing latch rollers 121 are used in this design to minimize friction and provide reliable latch release even when load current gradually decays to the release setting. The latch lever pivot point 123 consists only of a short length of round bar stock and has no retaining or mounting hardware. The latch levers 119 and bar 123 are held in place on the pivot rod by cavities molded into the contactor base 7.

As set forth above, the contactor 1 of this invention is a single pole magnet closed device employing an electromagnetic blowout type contact structure together with a single break main contact. The arc blowout unit 9 comprises a magnetic blowout coil 133 (FIG. 3) and a ferromagnetic core 135. The coil 133, being mounted on the insulating base 7, consists of a single turn around the core 135 and is an extension of the line terminal 21. Inasmuch as the electric circuit moves from the line terminals and through the blowout coil 133, the blowout coil is on continuous duty. Space is not available, however, for a multiple turn continuous duty coil. For that reason, an auxiliary coil 137 is provided which operates intermittently, that is, when the arc 39 transfers to a line arc horn 140 after the contacts 13, 15 are separated.

The auxiliary coil 137 comprises end portions 137a and 137b (FIG. 1), the former of which is secured by suitable means, such as a screw 139, to the lower end of the blowout coil 133 adjacent to the stationary contact 13. The end portion 137b is connected to a line arc horn connector 141 through a conductor 143 extending through an insulator mounting 145. The auxiliary coil 137 has a plurality of, such as four, coil turns around the core 135. A pair of pole pieces 147, 149 (FIG. 2) extend from the ends of the core 135. The pole pieces 147, 149 are ferromagnetic flux carrying members, one pole piece extending from one end of the core 135 and the other pole piece extending from the other end of the core and radially of the coils 133, 137 to opposite sides of the arc chute 11. Thus, when a magnetic field is generated between the pole pieces so that when an arc occurs under load conditions, the arc is more readily transferred from the contacts 13, 15 to the line arc horn 140 and a load arc horn 151.

Under heavy load conditions the single turn blowout coil 133 provides sufficient magnetizing forces to saturate the ferromagnetic core 135 so that a maximum blowout field strength is available when the main contacts 13, 15 separate, whereby optimum blowout field conditions prevail for arc interruption in the arc chute 11. When the arc 39 transfers to the arc horn 140, 151, the auxiliary coil 137, which is connected in series with the coil 133, increases the blowout magnetizing force. Under heavy load conditions the core 135 is saturated and the additional magnetizing force developed by the auxiliary coil 137 is unnecessary. However, where lighter loads exists, the single turn coil 133 is unable to develop sufficient magnetizing force to provide an adequate blowout field strength to interrupt the arc 39. Under this condition the extra magnetizing force provided by the multiple turn auxiliary coil 137 is necessary.

Accordingly, the device of this invention provides a compact, low cost, single pole, DC magnetic contactor having increased ratings for a given size and comprising unique contact structure, contact support construction, and latch structure for preventing the main contacts from opening when a load current exceeds a predetermined value but when the load current decays to a second predetermined value, the latch disengages to permit the contacts to open if the operating magnet is deenergized. Moreover, a release setting adjustment is provided. A separate magnet is provided for the latch, so latch release current is not affected by main contact condition, contact spring tolerances, holding coil voltage, holding coil temperature, etc. Due to the mechanical advantage of the latch, the latch magnet requires relatively small force so can be supplied with a relatively large non-magnetic gap (0.062) to permit operation at a point on the pull curve which is relatively flat. This results in relatively small change in release current value with small changes in armature gap found in normal operation.

What is claimed is:

1. An electromagnetic contactor comprising stationary and movable contacts, electromagnetic means for moving the movable contact to the closed position, operative means for moving the movable contact to the open position when the electromagnetic means is deenergized, the electromagnetic means comprising an operating armature movable between energized and deenergized positions, latch means for latching the armature in the energized position to hold the contacts in the closed position in the event the load current exceeds a predetermined value even though the electromagnetic means is deenergized, the latch means comprising a latch magnet responsive to a predetermined value of load current to effect movement of the latch means to the latched position of the armature, a frame mounting the latch magnet, the latch means also comprising a latch lever and lever-engaging roller, the latch lever being on one of the frame and the operating armature, and the lever-engaging roller being on the other of the frame and the operating armature.

2. The contactor of claim 1 in which the latch lever is on the frame.

3. The contactor of claim 2 in which the latch lever is a bell crank having a roller-engaging hooked portion at one end, the other end of the lever comprising a latch armature responsive to the latch magnet when the load current exceeds the predetermined value to effect latching of the operating armature in the energized position.

4. The contactor of claim 3 in which the contactor comprises a housing, a spring on one of the lever and housing, and a spring-engaging calibration screw on the other of the lever and housing to effect adjustments in the value of the load current at which an unlatching force is exerted on the latch armature.

5. The contactor of claim 4 in which the spring is on the frame, and the calibration screw is on the latch armature.

6. The contactor of claim 5 in which means are provided for opening the contacts comprising a kickout spring operatively connected to the armature to effect opening of the armature when the electromagnetic means is deenergized.

7. The contactor of claim 4 in which a bias spring is operatively connected to the latch lever to control the pickup current magnitude of the latching lever.

8. The contactor of claim 4 in which the nonmagnetic gap between the latch magnet and the latch armature is about 0.062 inch.

9. The contactor of claim 8 in which the magnetic circuit is operated below its saturation point to effect a magnetic field strength in the latch magnet that is proportional to the load current whereby the latch accurately senses the load current.

10. The contactor of claim 7 in which the force of the bias spring is selected to effect a bistable latch movement.

11. The contactor of claim 3 in which a magnetic field in the latch armature is at right angles to a magnetic field in the operating electromagnet to prevent interaction between the operating magnet and the latch magnet.

12. The contactor of claim 3 in which the contactor comprises a base, and means for mounting the latch magnet on the base in adjustable positions to effect engagement between the latch lever and the lever-engaging roller.

13. The contactor of claim 3 in which the hooked portion includes a roller engaging surface inclined away from the roller axis to expedite release of the latch.

14. The contactor of claim 13 in which the rollers are mounted on needle bearings.

15. The contactor of claim 12 in which the latch lever is pivoted on an elongated pin that is captivated between the magnet frame and a groove molded into the contactor base.

* * * * *